(12) United States Patent
Chavez

(10) Patent No.: US 10,797,920 B1
(45) Date of Patent: Oct. 6, 2020

(54) HIGH-ENTROPY CONTINUOUS PHASE MODULATION DATA TRANSMITTER

(71) Applicant: Rockwell Collins, Inc., Cedar Rapids, IA (US)

(72) Inventor: Carlos J. Chavez, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 16/822,992

(22) Filed: Mar. 18, 2020

(51) Int. Cl.
| | |
|---|---|
| *H04L 27/20* | (2006.01) |
| *H04L 27/12* | (2006.01) |
| *H04B 1/68* | (2006.01) |
| *H04B 1/04* | (2006.01) |
| *H04B 1/717* | (2011.01) |

(52) U.S. Cl.
CPC ............ *H04L 27/122* (2013.01); *H04B 1/04* (2013.01); *H04B 1/68* (2013.01); *H04B 1/717* (2013.01)

(58) Field of Classification Search
CPC ....... H04L 27/122; H04L 27/18; H04L 27/20; H04L 27/2003–2028; H04L 2203/00–04; H04B 1/04; H04B 1/68; H04B 1/69; H04B 1/692; H04B 1/717
See application file for complete search history.

(56) References Cited

U.S. PATENT DOCUMENTS

| | | | | |
|---|---|---|---|---|
| 5,832,022 A * | 11/1998 | Scott | ............... | H04L 27/201 |
| | | | | 375/142 |
| 6,259,400 B1 * | 7/2001 | Higgins | ............... | F41G 7/301 |
| | | | | 342/357.22 |
| 6,335,951 B1 * | 1/2002 | Cangiani | ............... | G01S 19/02 |
| | | | | 342/357.395 |
| 6,343,207 B1 * | 1/2002 | Hessel | ............... | H04B 1/0003 |
| | | | | 455/552.1 |
| 6,430,213 B1 * | 8/2002 | Dafesh | ............... | H04B 1/7075 |
| | | | | 375/146 |
| 6,535,642 B1 * | 3/2003 | De Bonet | ............... | G06T 9/005 |
| | | | | 382/232 |
| 6,731,614 B1 * | 5/2004 | Ohlson | ............... | H04B 1/707 |
| | | | | 370/320 |
| 6,968,021 B1 * | 11/2005 | White | ............... | H04L 1/005 |
| | | | | 375/265 |

(Continued)

*Primary Examiner* — James M Perez
(74) *Attorney, Agent, or Firm* — Suiter Swantz pc llo

(57) ABSTRACT

System for generating a constant envelope and suppressed cyclic feature signal may include a transmission security (TRANSEC) function, a spread spectrum chip, an M-ary continuous phase modulator, and a pulse-shaped filter. The TRANSEC may generate a pseudorandom symbol by M-ary symbol generation selects a symbol with a signal phase, and the spread spectrum chip corresponding to the generated pseudorandom symbol or a phase rotation of the pseudorandom symbol. The M-ary continuous phase modulator with a delta-phase mapper maps the signal phase based at least in part on the selected symbol. The pulse-shaped filter of the M-ary modulator introduces inter-symbol interference from a previous and a subsequent symbol into a current symbol; the inter-symbol interference may be introduced by the main lobe of the signal phase being contained within a bandwidth of a chip rate of the spread spectrum chip for frequency modulation signal transmission of information by the generated signal.

15 Claims, 18 Drawing Sheets

(56) References Cited

U.S. PATENT DOCUMENTS

| | | | |
|---|---|---|---|
| 7,035,245 B2 * | 4/2006 | Orr | H04B 1/707 370/320 |
| 7,088,793 B1 * | 8/2006 | Mickelson | H04L 1/005 375/229 |
| 7,120,198 B1 * | 10/2006 | Dafesh | G01S 19/02 375/261 |
| 7,154,962 B2 * | 12/2006 | Cangiani | H04L 5/04 375/295 |
| 7,280,464 B1 * | 10/2007 | Newhouse | H04L 27/2662 370/203 |
| 7,289,574 B2 * | 10/2007 | Parolari | H04L 1/0003 375/259 |
| 7,483,711 B2 * | 1/2009 | Burchfiel | H04B 7/0408 455/522 |
| 7,508,887 B1 * | 3/2009 | Chavez | H04L 5/1423 370/310 |
| 7,570,711 B1 * | 8/2009 | Chavez | H03F 1/0294 330/10 |
| 7,609,755 B2 * | 10/2009 | Rasmussen | H04L 27/22 375/149 |
| 7,656,931 B2 * | 2/2010 | Smith | H04B 1/692 375/131 |
| 7,660,338 B2 * | 2/2010 | Smith | H04B 1/692 375/131 |
| 7,680,210 B2 * | 3/2010 | Bode | H04L 27/2017 375/297 |
| 7,822,100 B2 * | 10/2010 | Rasmussen | H04L 25/03834 375/130 |
| 7,843,988 B1 * | 11/2010 | Snodgrass | H04B 1/7097 375/146 |
| 7,940,831 B1 * | 5/2011 | Thommana | H04B 1/71 370/335 |
| 8,009,761 B2 * | 8/2011 | Lai | H04L 27/2017 375/273 |
| 8,041,363 B2 * | 10/2011 | Burchfiel | H04B 7/0408 455/452.1 |
| 8,073,079 B1 * | 12/2011 | Ahmed | H04L 27/2275 329/318 |
| 8,189,646 B2 * | 5/2012 | Ries | G01S 19/30 375/140 |
| 8,190,093 B2 * | 5/2012 | Burchfiel | H04W 52/343 455/63.1 |
| 8,422,381 B1 * | 4/2013 | Snodgrass | H04L 43/12 370/252 |
| 8,494,534 B2 * | 7/2013 | Burchfiel | H04W 52/343 455/445 |
| 8,498,614 B1 * | 7/2013 | Salam | H04K 3/226 455/344 |
| 8,565,336 B2 * | 10/2013 | Lim | H04L 27/183 375/260 |
| 8,675,751 B2 * | 3/2014 | Cannon | H04L 27/183 375/144 |
| 8,774,315 B2 * | 7/2014 | Cahn | H04B 1/707 375/274 |
| 9,391,818 B1 * | 7/2016 | Rao | H04L 25/0226 |
| 9,473,332 B2 * | 10/2016 | Bajcsy | H04B 1/40 |
| 9,564,935 B2 * | 2/2017 | Kurihara | H03F 3/245 |
| 9,699,011 B1 * | 7/2017 | Sethi | H04L 27/2017 |
| 9,813,276 B2 * | 11/2017 | Jungnickel | H04L 27/2649 |
| 9,887,768 B1 * | 2/2018 | Thommana | H04B 1/06 |
| RE47,633 E * | 10/2019 | Karabinis | H04W 88/08 |
| 10,447,339 B2 * | 10/2019 | Michaels | H04L 27/122 |
| RE47,720 E * | 11/2019 | Burchfiel | H04W 52/343 |
| 2003/0147655 A1 * | 8/2003 | Shattil | H04L 27/00 398/182 |
| 2004/0081248 A1 * | 4/2004 | Parolari | H04L 1/0003 375/259 |
| 2004/0092281 A1 * | 5/2004 | Burchfiel | H04B 7/0408 455/522 |
| 2005/0141594 A1 * | 6/2005 | Smith | H04B 1/692 375/130 |
| 2006/0154622 A1 * | 7/2006 | Piirainen | H03F 1/32 455/115.1 |
| 2007/0025235 A1 * | 2/2007 | Rasmussen | H04L 27/2003 370/208 |
| 2008/0019422 A1 * | 1/2008 | Smith | H04B 1/713 375/136 |
| 2009/0110033 A1 * | 4/2009 | Shattil | H04J 14/0298 375/141 |
| 2009/0135957 A1 * | 5/2009 | Norris | H04L 27/22 375/330 |
| 2009/0312028 A1 * | 12/2009 | Burchfiel | H04B 7/0408 455/450 |
| 2010/0067619 A1 * | 3/2010 | Furman | H04L 27/0014 375/326 |
| 2010/0203854 A1 * | 8/2010 | Yu | H04L 25/03834 455/127.1 |
| 2010/0316166 A1 * | 12/2010 | Van Thillo | H04L 25/03159 375/308 |
| 2012/0064928 A1 * | 3/2012 | Burchfiel | H04W 52/343 455/501 |
| 2012/0269067 A1 * | 10/2012 | Burchfiel | H04W 52/343 370/236 |
| 2012/0269235 A1 * | 10/2012 | Pratt | G01S 19/02 375/147 |
| 2015/0280945 A1 * | 10/2015 | Tan | H04B 7/0669 375/267 |
| 2017/0103204 A1 * | 4/2017 | Mitola, III | G06F 21/57 |
| 2018/0309477 A1 * | 10/2018 | Michaels | H04L 27/20 |
| 2019/0036674 A1 * | 1/2019 | Romano | H04J 11/00 |
| 2019/0052486 A1 * | 2/2019 | Kuchi | H04L 27/2607 |
| 2019/0253138 A1 * | 8/2019 | Todeschini | H04L 5/0044 |

* cited by examiner

HIGH-ENTROPY CONTINUOUS PHASE MODULATION DATA TRANSMITTER

TECHNICAL FIELD

The present invention is generally related to low probability of detection communication and more particularly to high-entropy continuous phase modulation communication.

BACKGROUND OF THE INVENTION

Low probability of detection (LPD) communication schema are designed to undetectably send information from one point to another via radio frequency to an authorized receiver (e.g., wireless communication). In order to prevent interception or detection, various methods are known which utilize pseudo-random sequences. Other methods utilize the basic structure of the modulation scheme and have associated rates (e.g., symbol rate, chip rate, hop rate, or the like). These methods are cyclostationary in that the signal's statistics are periodic but the signal itself is not periodic. Unfortunately, cyclostationary signals exhibit features which can be utilized by unauthorized receivers and are therefore susceptible to detection via carrier frequency, symbol rate, or other cyclic features. Conventional modulation types such as Quadrature Phase Shift Keying (QPSK) and Binary Phase Shift Keying (BPSK) exhibit cyclic structure and are susceptible to adversarial detection and therefore have limited LPD utility.

Thus, those skilled in the art desire a system of LPD that denies structural methods of detection and forces adversarial detectors to use less productive and inefficient energy detection techniques (radiometric detection).

SUMMARY OF THE INVENTION

The present disclosure teaches a communication system utilizing communication links without associated structural signal features. In some embodiments the present disclosure may also include randomized pilot and preamble sequences.

Ideally, the modulated signals of the present disclosure should mimic Gaussian distributed thermal noise. However, producing such signals generally requires a high peak-to-average-power ratio. This often produces large peaks which subvert the production of a statistically desirable signal. To overcome this problem a high output linear power amplifier is required. Such an amplifier is needed to produce a link capable of working over a useful distance with a margin against jamming. Transportable LPD transmitters have been impractical since sufficiently linear power amplifiers are large, heavy, and inefficient.

The present disclosure teaches a constant envelope modulation communication (e.g., FSK, GFSK, MSK, and GMSK) powered via a smaller, lighter, and more efficient power amplifier meeting SWaP-C criteria and LPD requirements.

In embodiments of the present disclosure a power amplifier may be operated at saturation without appreciable waveform effects. The high-entropy continuous phase communication system of the present invention provides long-range communication links with difficult to identify or detect structural features. The high-entropy (randomness) of the constant envelope signal of the present invention reduces signal statistical structure. The present disclosure teaches a communication system with suppressed signal features for low probability of detection (LPD) so as to deny structure detection techniques to adversary detection systems. The present disclosure prevents or inhibits cyclostationary feature methods of signal detection (chip rate, carrier frequency) and forces adversarial detectors to utilize low-performance energy detection techniques. Ideally, the communication signals of the present disclosure have waveforms (featureless modulation) comparable to frequency-modulated Gaussian noise. The constant envelope featureless signaling techniques of the present disclosure are described in further detail herein.

DETAILED DESCRIPTION

The present disclosure teaches the use of mimesis as a basis for an LPD communication system. In preferred operations, current embodiments of the disclosure teach high power, difficult to jam, data communication waveforms which masquerade as frequency-modulated Gaussian noise.

Although Gaussian noise does not have a constant envelope and generating Gaussian-like waveforms presents a difficult amplification problem, in embodiments of the present disclosure a constant-envelope signal driven non-linearly is preferred. In embodiments of the present disclosure, a signal in a controlled spectrum having a finite bandwidth with a pseudorandom phase that suppresses features (cyclic or periodic) appears to intruders (eavesdroppers) as frequency modulated Gaussian noise.

In contrast with the present disclosure, which in current embodiments also utilizes a spreading sequence, in direct-sequence spread spectrum (DSSS) (a spread-spectrum modulation technique) an overall decrease in signal interference is obtained. A direct-sequence modulation makes the transmitted signal wider in bandwidth than the information bandwidth. After removal of the spreading sequence in the receiver (despreading), the information bandwidth is restored, and unintentional and intentional interference is reduced. In embodiments of the present disclosure, bits are modulated by a pseudorandom bit sequence (chip) with a much shorter duration (larger bandwidth) than the original message bits. The modulation of the message bits scrambles and spreads the data, resulting in a bandwidth size comparable to the spreading sequence. In operation, the smaller the chip duration, the larger the bandwidth of the resultant DSSS signal. This technique has been utilized to reduce interference. Unlike conventional DSSS, embodiments of the present disclosure induce signal structures that look like background noise rather than man-made data transmissions. Likewise, embodiments of the present disclosure reduce chip rate, carrier frequency, and other detectable cyclic signal structures producing data transmission signals with frequency-modulation Gaussian noise characteristics (stochastic).

Figure 1:
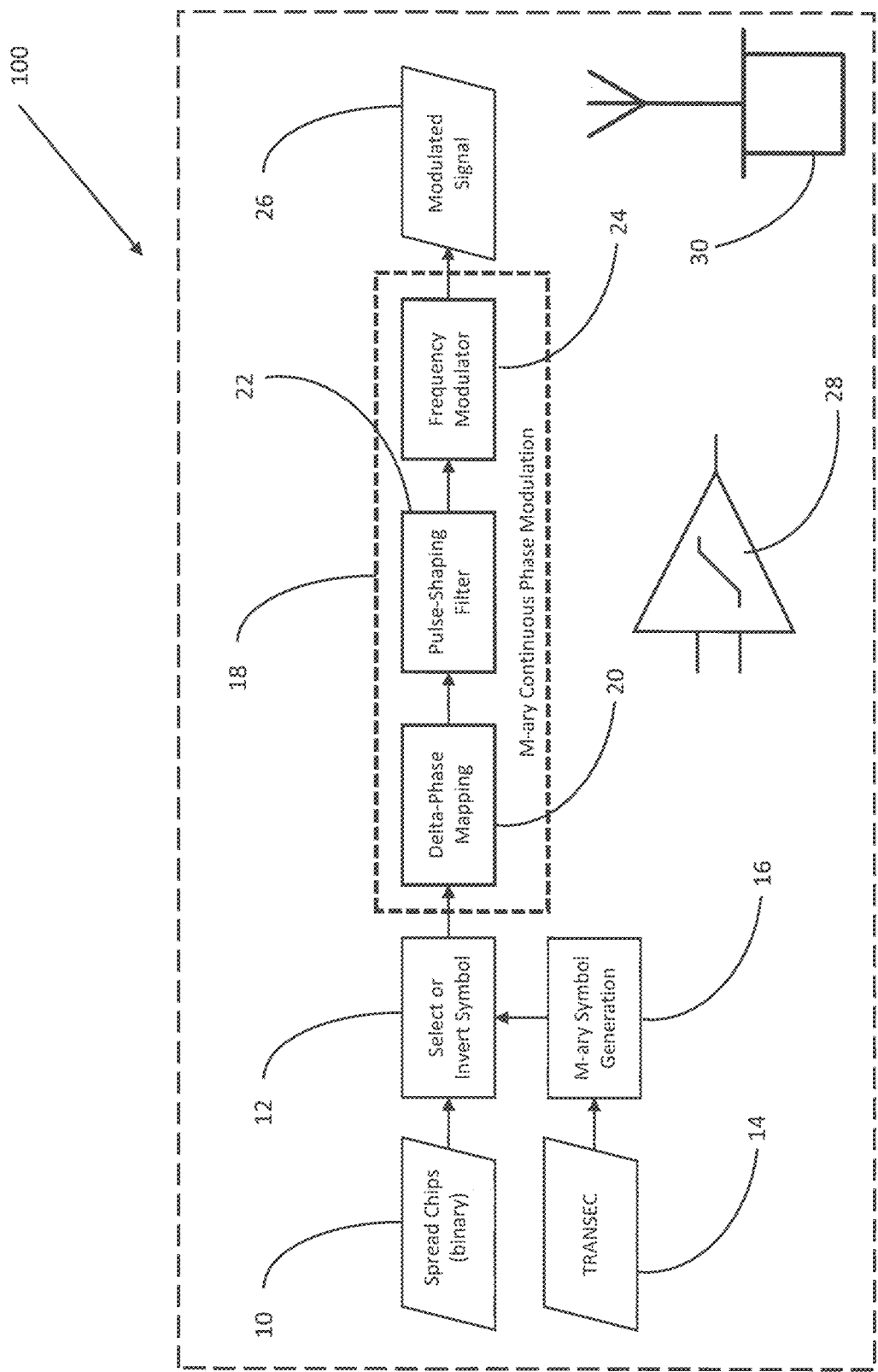
FIG. 1 is a transmitter schematic of an embodiment of the LPD communicator of the present invention for producing signals having characteristics similar to frequency-modulated noise.
Figure 2:
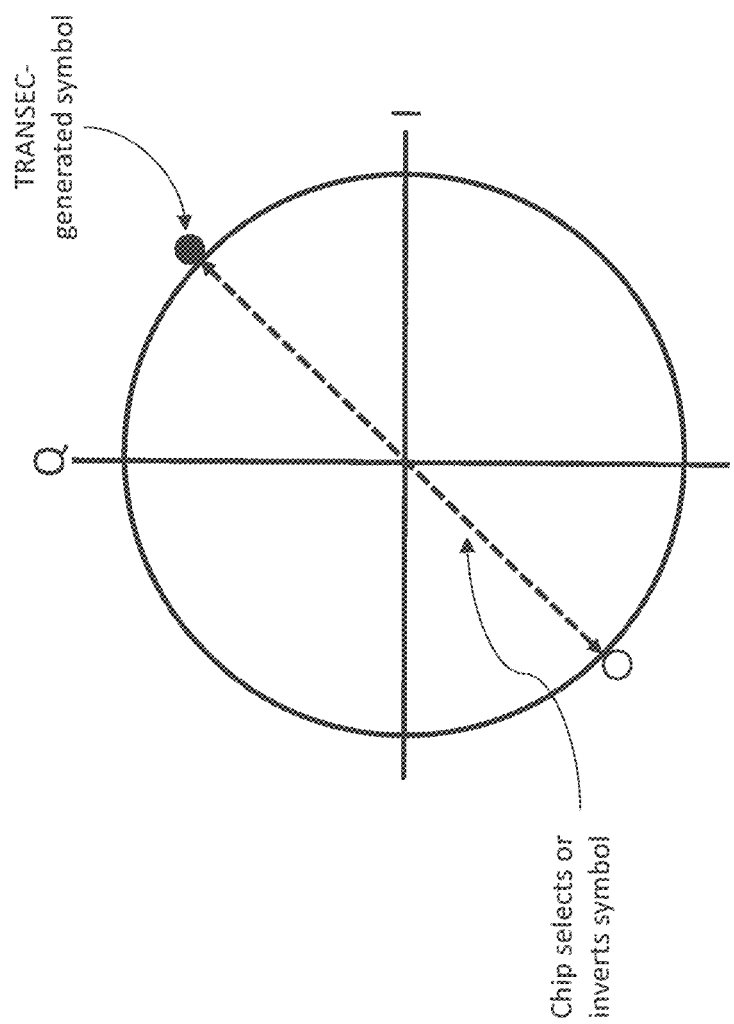
FIG. 2 is a complex plane illustrating a TRANSEC generated pseudorandom symbol corresponding to a signal phase where/is the in-phase (real) part and Q is the quadrature (imaginary) part.
Figure 3A:
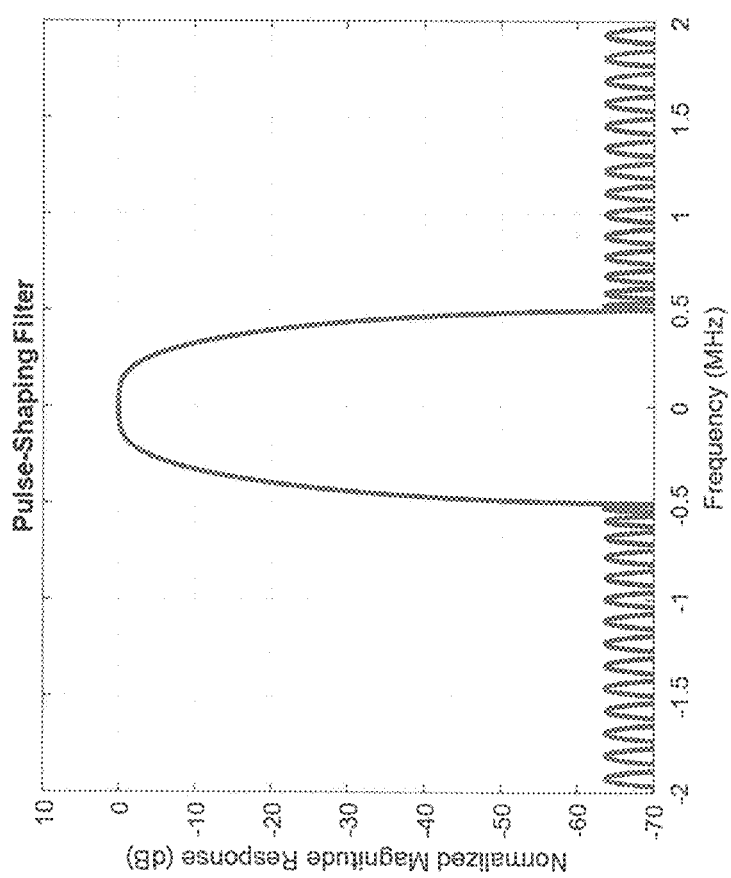
FIG. 3A is a frequency response plot of a pulse-shaping filter of the present invention illustrating the containment of the signal spectrum prior to frequency modulation which introduces intentional inter-symbol interference (ISI)
Figure 3B:
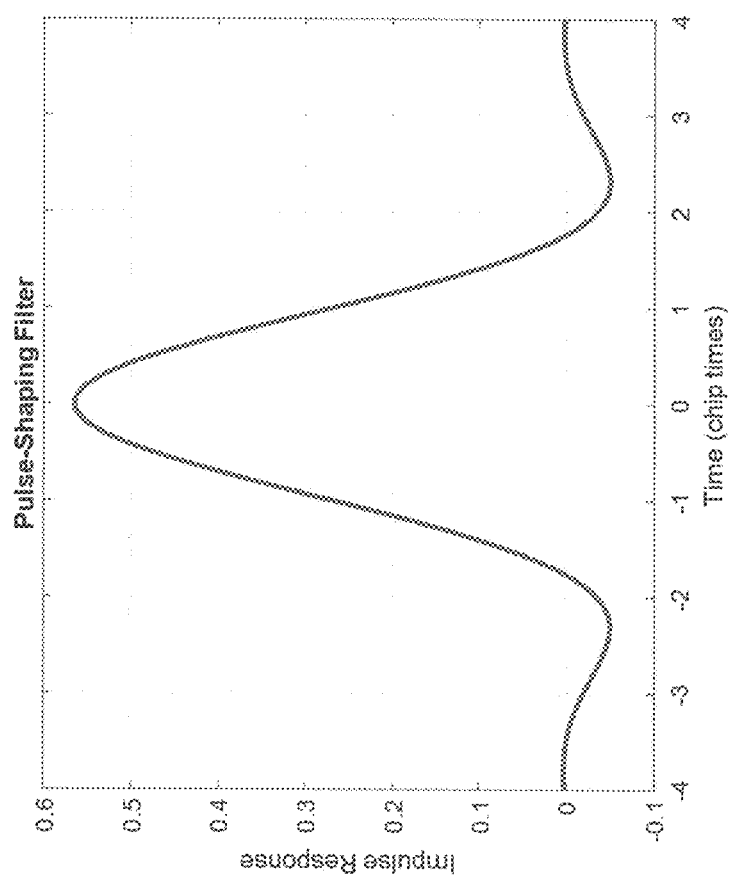
FIG. 3B is an impulse response plot of a pulse-shaping filter illustrating the intentional ISI at adjacent chip times of an embodiment of the present disclosure.
Figure 4:
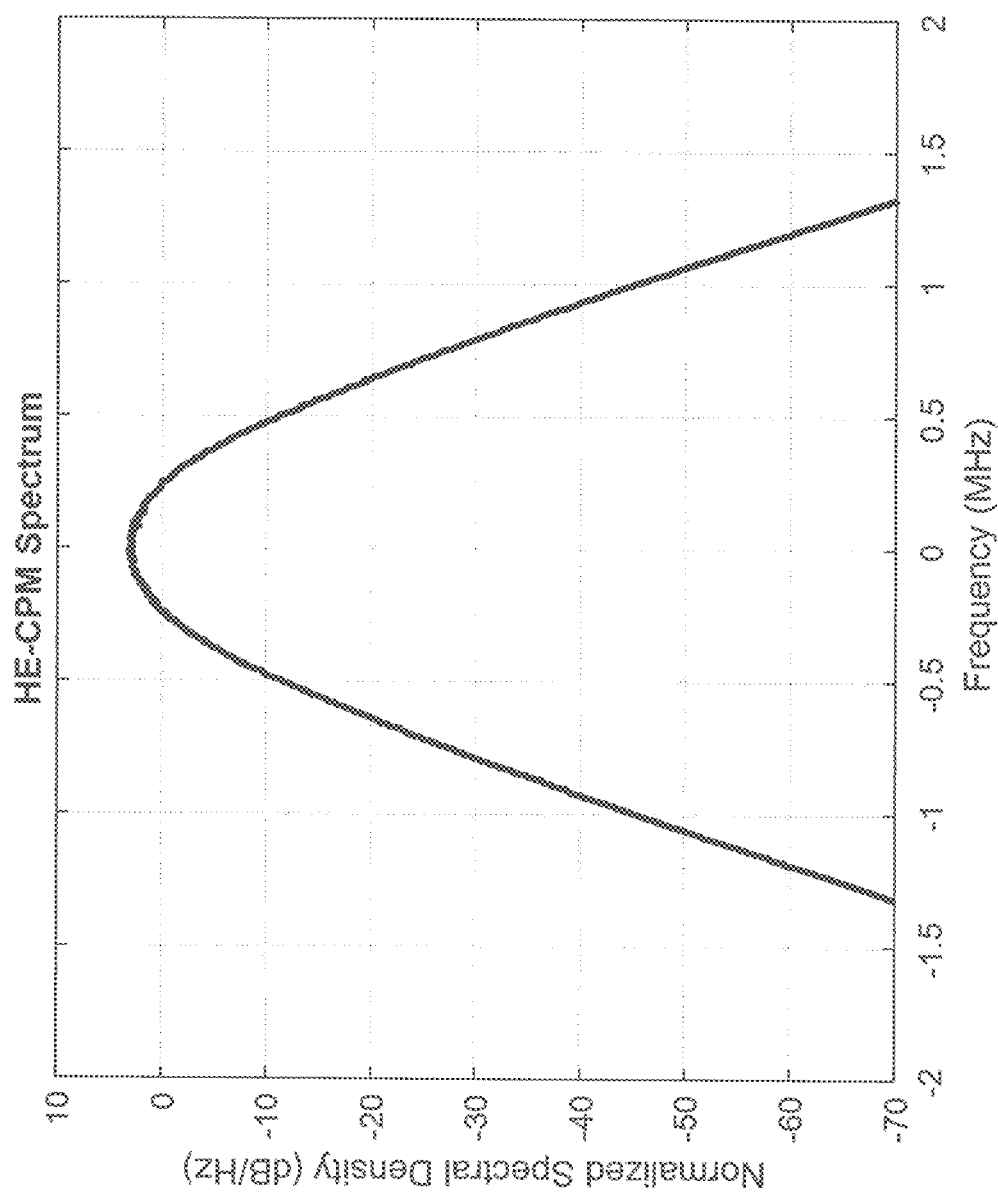
FIG. 4 is a sample power spectral density plot of the output of an embodiment of the high-entropy continuous phase modulation of the present disclosure illustrating the Gaussian shaped spectral curve of the constant envelope output after modulation.

FIG. 1 is a high-level schematic of an exemplary embodiment of the present disclosure 100 (HE-CPM communicator). In a direct-sequence spread-spectrum embodiment, a spread chip (or chips) (having a chip rate) 10 selects a symbol 12 from a TRANSEC (transmission security) generated pseudorandom symbol corresponding to the signal phase for one or more chips 14 of an M-ary symbol generator 16. The chip(s) 10 may invert the symbol 180° (FIG. 2) based on the binary value of the chip for M-ary modulation 18. The M-ary continuous phase modulation 18 is accomplished first (in a current embodiment) via delta-phase mapping 20. Delta-phase mapping 20 may be affected with, for example, a mapping of the M-ary symbol to a change in the signal phase depending on the value of the M-ary symbol. The output of the delta-phase mapper 20 is then pulse-shaping filtered 22. Each symbol is filtered by the pulse-shaping filter 22 to band-limit the communication signal and introduce intentional inter-symbol interference (ISI) (FIGS. 3A & 3B). The ISI further randomizes the modulated signal phase of the signal. The output of the pulse-shaping filter 22 is then modulated by the frequency modulator 24 to produce an M-ary high-entropy continuous phase modulated signal 26 (FIG. 4) having a constant envelope, a Gaussian shaped spectrum, and the likeness of frequency-modulated Gaussian noise for LPD transmission via transmitter 30. FIG. 4 is an example of an 8-ary HE-CPM with a 1 MHz chip rate.

Figure 5:
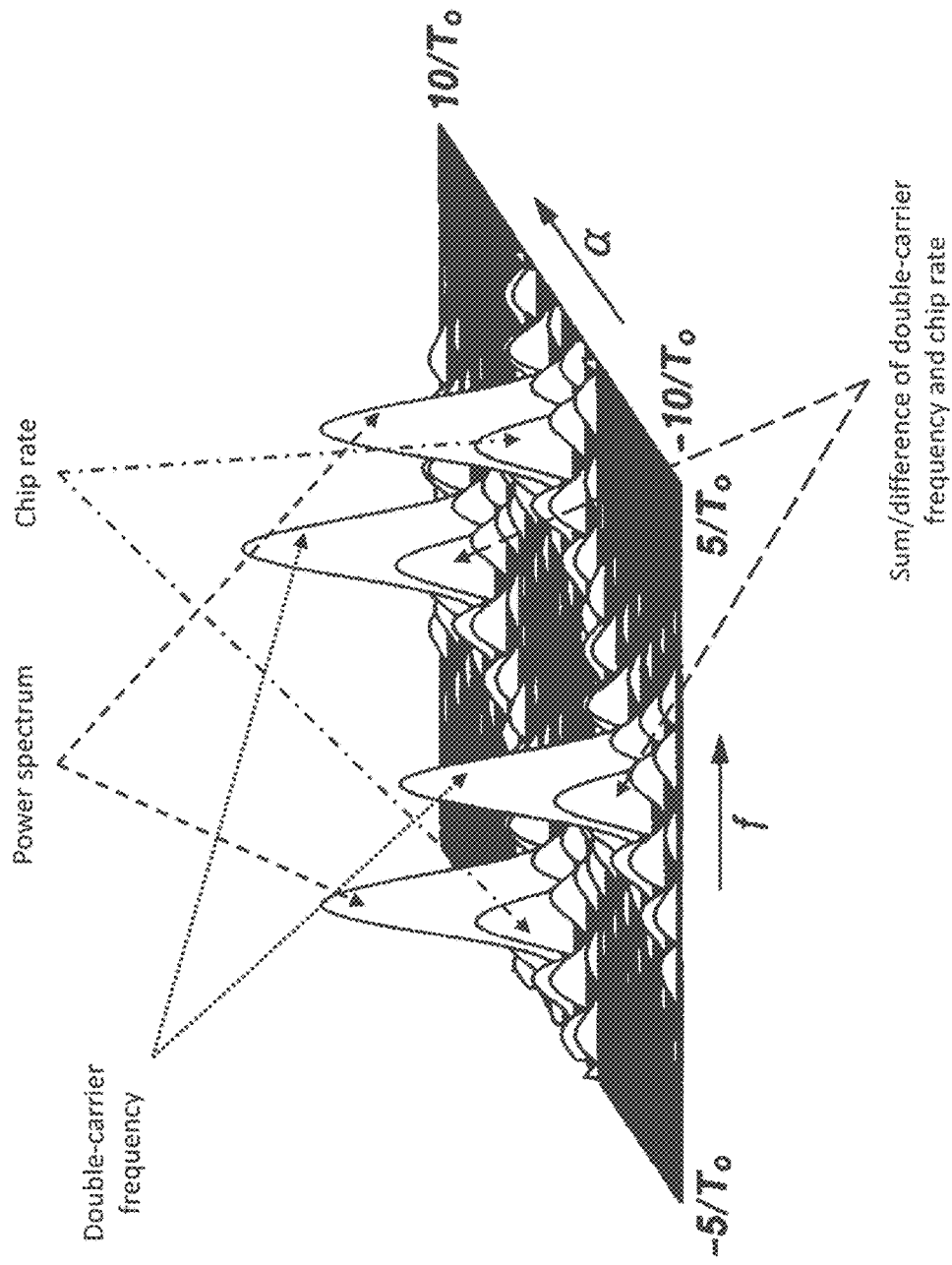
FIG. 5 is an example isometric cyclic frequency plot illustrating the cyclic spectrum (spectral correlation) of a cyclostationary generalization of spectral density.

FIG. 5 illustrates an example of known detectable features in the cyclic spectrum of real-valued binary phase-shifted keying (BPSK) in the cyclic spectrum (a cyclostationary generalization of spectral density). As an example, autocorrelation (for complex-valued signals) is given as:

$$R_{xx}(\tau) = \langle x(t)x^*(t-\tau) \rangle,$$

the spectral density is:

$$S_{xx}(f) = \mathcal{F}\{R_{xx}(\tau)\}$$

Where the cyclic autocorrelation and conjugate cyclic correlation at a cyclic frequency a is:

$$R_{xx}^{\alpha}(\tau) = \langle x(t)x(t-\tau)e^{-j2\pi\alpha t} \rangle e^{j\pi\alpha\tau}$$

and $$R_{xx^*}^{\alpha}(\tau) = \langle x(t)x(t-\tau)e^{-j2\pi\alpha t} \rangle e^{j\pi\alpha\tau}.$$

Where the cyclic spectrum and conjugate cyclic spectrum may be given as:

$$X(f) = \mathcal{F}\{x(t)\},$$

$$S_{xx}^{\alpha}(f) = \mathcal{F}\{R_{xx}^{\alpha}(\tau)\} = \langle X(f - \frac{\alpha}{2})X^*(f + \frac{\alpha}{2}) \rangle,$$

and $$S_{xx^*}^{\alpha}(f) = \mathcal{F}\{R_{xx^*}^{\alpha}(\tau)\} = \langle X(f + \frac{\alpha}{2})X(\frac{\alpha}{2} - f) \rangle.$$

Cyclic spectrum and cyclic autocorrelation only capture 2nd-order features, 2nd-order cyclic moments (equivalent to cyclic autocorrelation and conjugate cyclic correlation), at a cyclic frequency a are given as:

$$M_{xx^*}^{\alpha}(\tau) = \langle x(t)x^*(t-\tau)e^{-j2\pi\alpha t} \rangle$$

and $$M_{xx}^{\alpha}(\tau) = \langle x(t)x(t-\tau)e^{-j2\pi\alpha t} \rangle.$$

While higher-order cyclic moments include:
  Multiple conjugation configurations (many redundant);
  Multiple time lags (many redundant); and
  Most features of interest occur in even-order cyclic moments, for zero lag or lags of one component.

Some selected 4th-order cyclic moments include:

$$M_{xx^*xx^*}^{\alpha}(0,0,\tau) = \langle x(t)x^*(t)x(t)x^*(t-\tau)e^{-j2\pi\alpha t} \rangle,$$

$$M_{xx^*xx^*}{}^\alpha(0,0,\tau)= \langle x(t)x^*(t)x(t)x^*(t-\tau)e^{-j2\pi\alpha t}\rangle,$$

and $$M_{xx^*xx^*}{}^\alpha(0,0,\tau)= \langle x(t)x^*(t)x(t)x(t-\tau)e^{-j2\pi\alpha t}\rangle.$$

Figure 6:
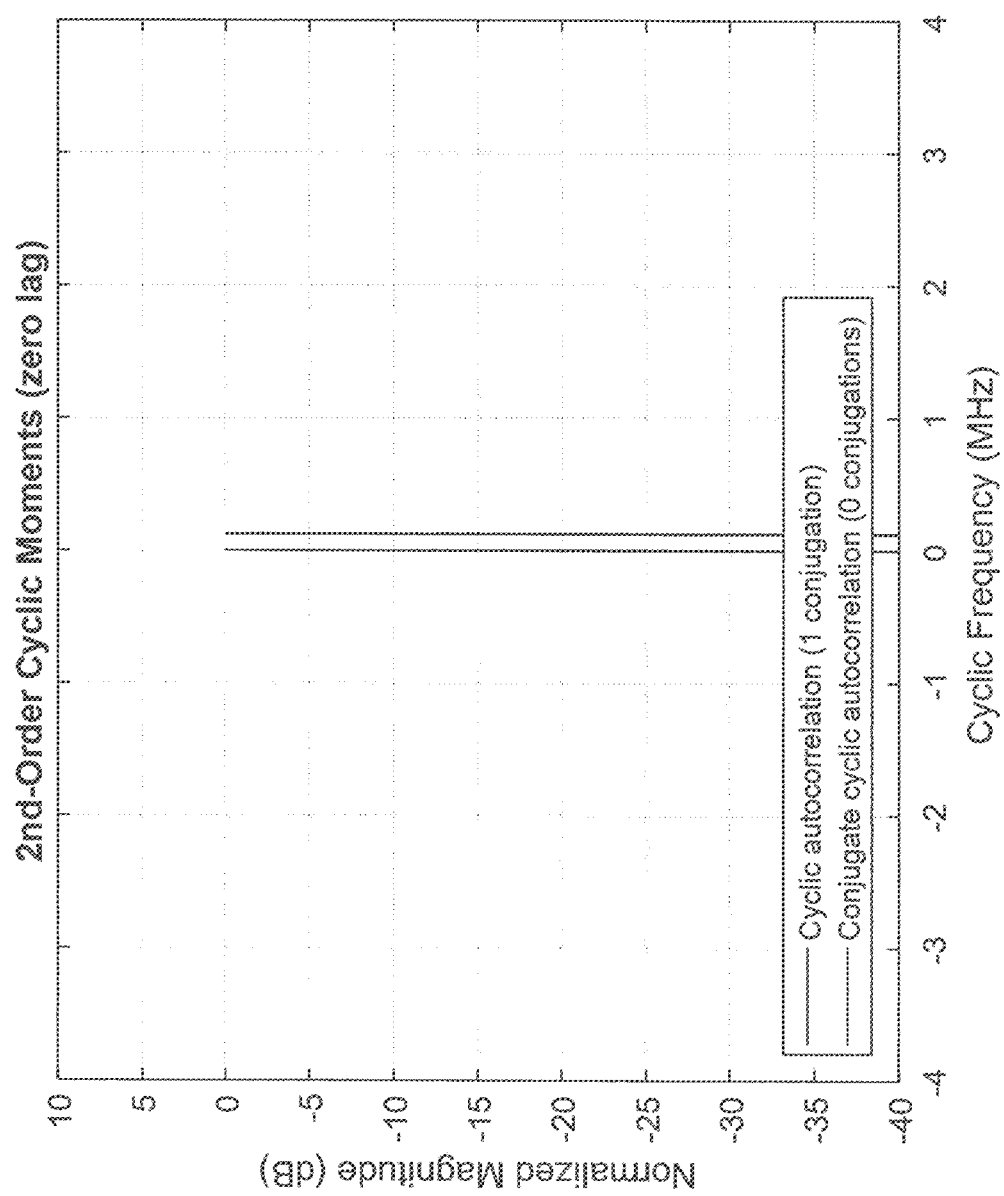
FIG. 6 is a plot of 2nd-order cyclic moments for rectangular BPSK with zero-lag illustrating the normalized magnitude (dB) of the cyclic autocorrelation and the conjugate cyclic autocorrelation.
Figure 7:
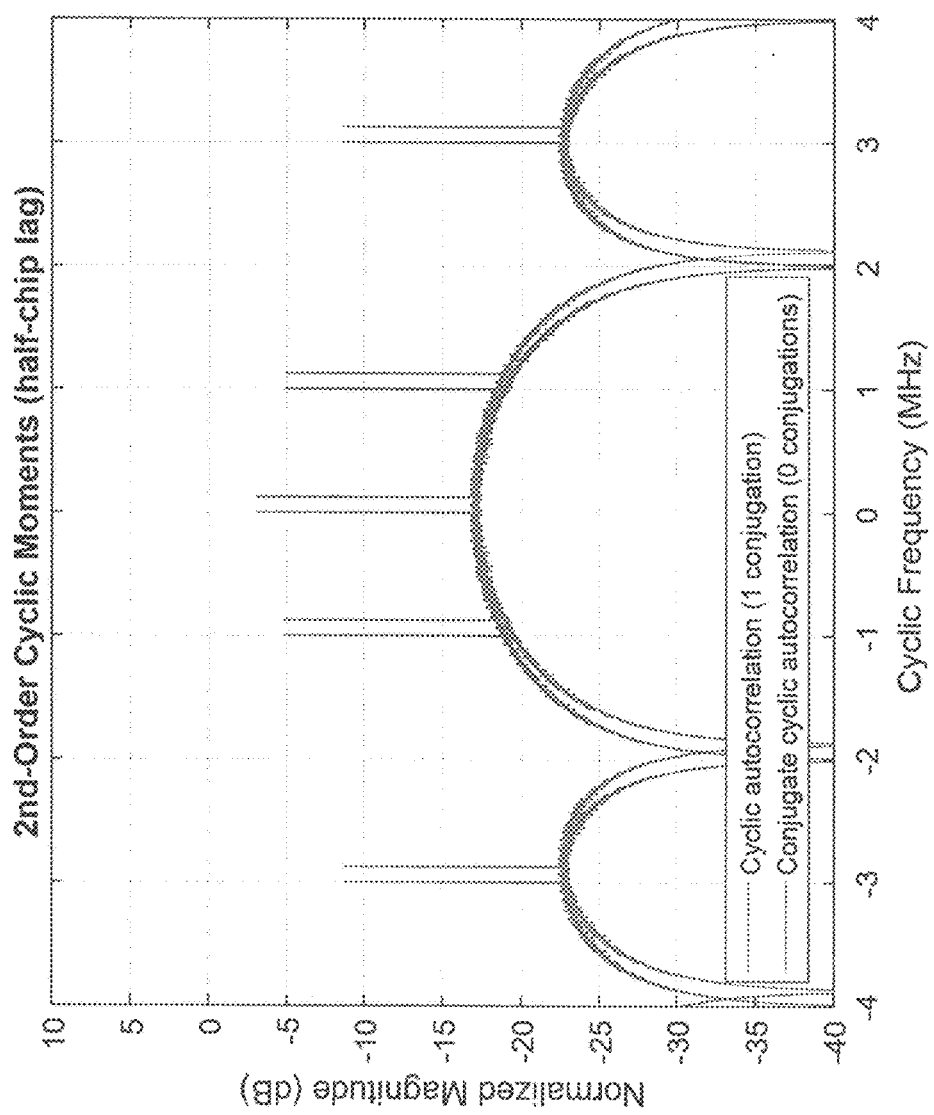
FIG. 7 is a plot of 2nd-order cyclic moments for rectangular BPSK with half-chip-lag illustrating the normalized magnitude (dB) of the cyclic autocorrelation and the conjugate cyclic autocorrelation.
Figure 8:
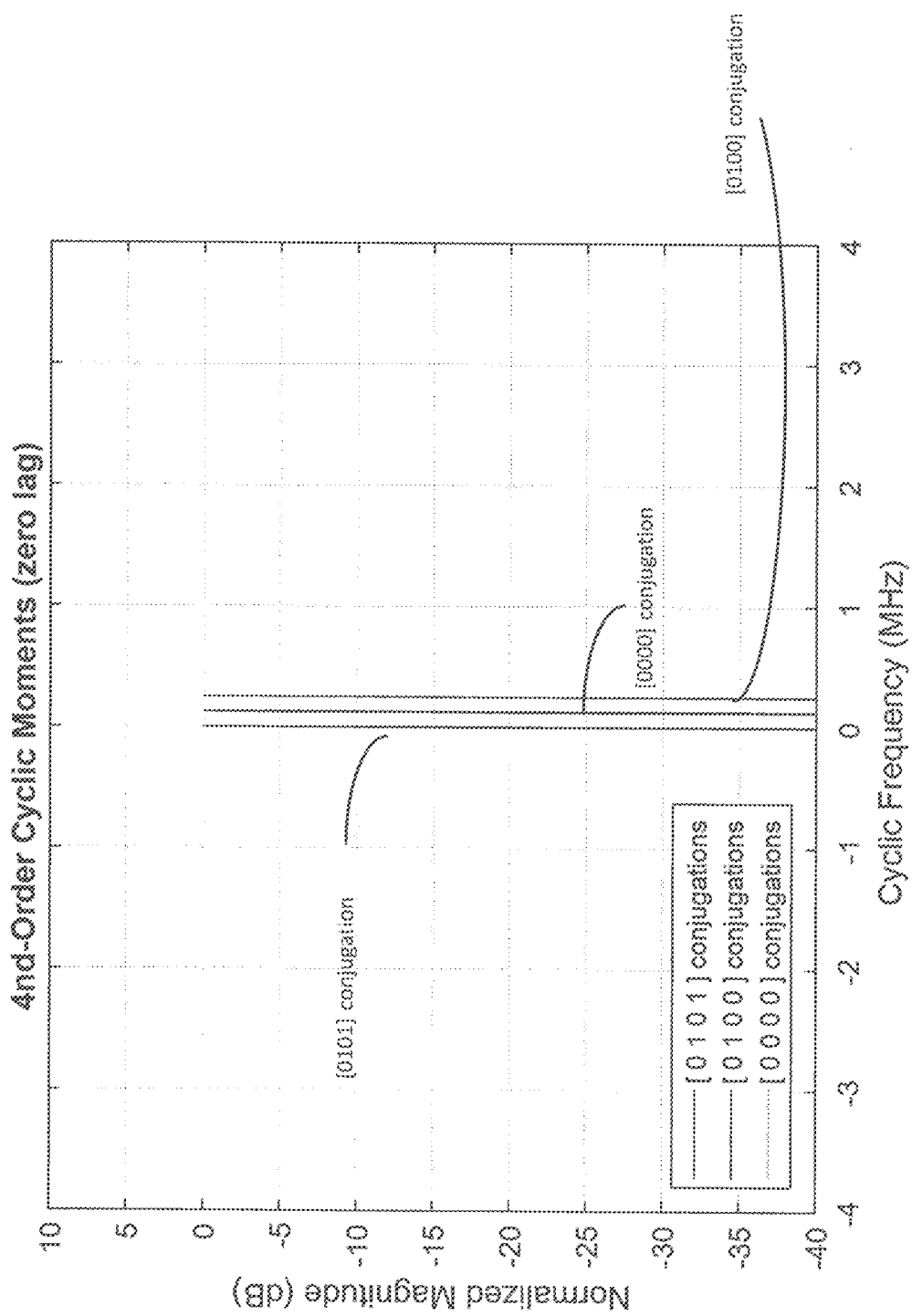
FIG. 8 is a plot of 4th-order cyclic moments for rectangular BPSK with zero-lag illustrating the normalized magnitude (dB) of various conjugations ([0101], [0100], & [000])
Figure 9:
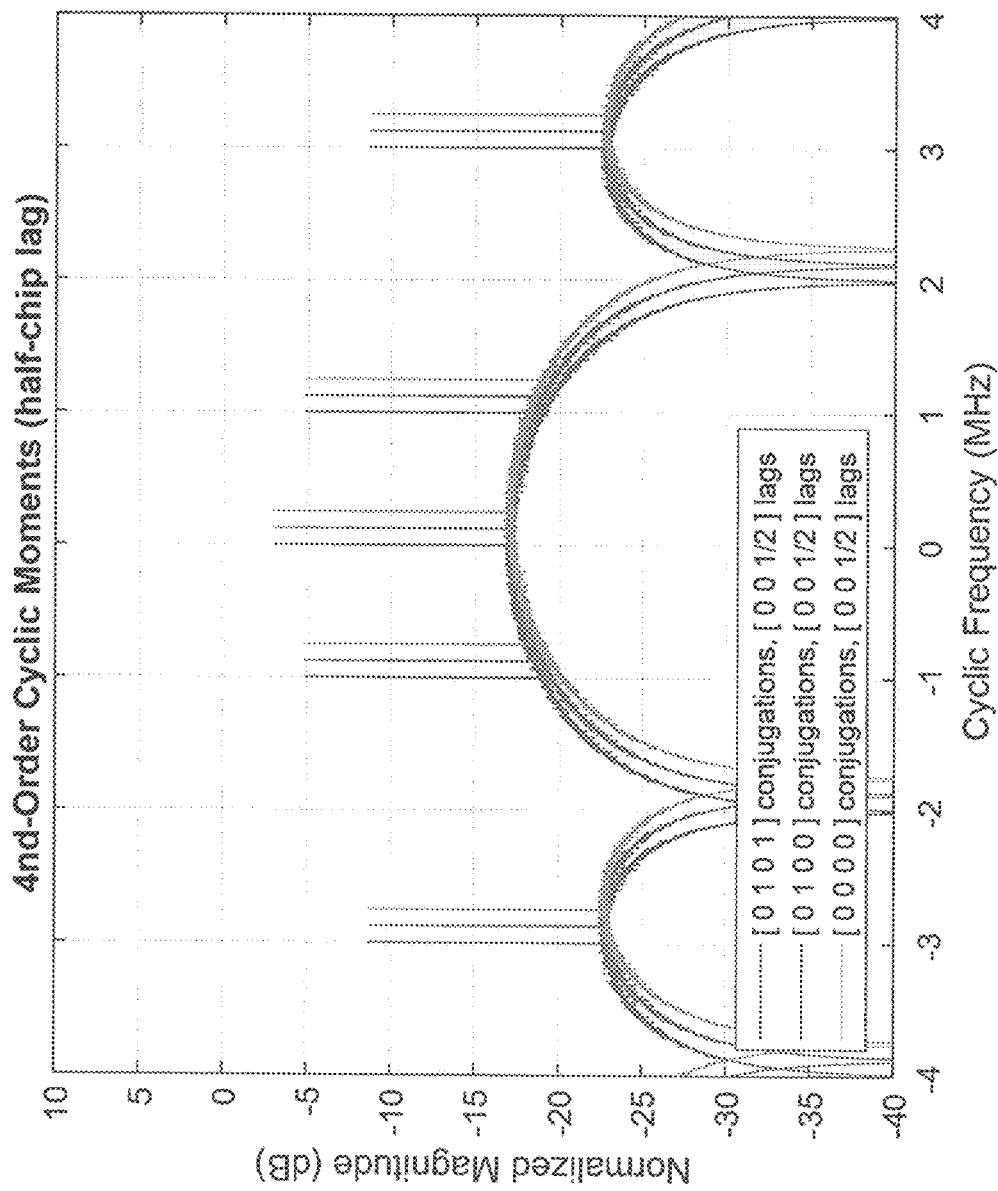
FIG. 9 is a plot of 4th-order cyclic moments for rectangular BPSK with half-chip-lag illustrating the normalized magnitude (dB) of various conjugations ([0101], [0100], & [0000])

FIGS. 6 through 9 and FIGS. 10 through 13 illustrate signal structures in known rectangular BPSK and root-raised-cosine QPSK systems. FIGS. 6 through 9 are plots of both 2nd-order and 4th-order moments at both zero (FIGS. 6 and 8) and half-chip lag (FIGS. 7 and 9) for rectangular BPSK at 1 MHz (with a 62.5 kHz carrier offset in order to better illustrate carrier frequency features). Second order features (FIG. 7) include chip rate and multiples with a double-carrier offset with a half-lag chip offset. FIG. 8 is a plot of 4th-order moments (zero lag) of various conjugations (([0101], [0100], & [0000]) where FIG. 9 illustrates 4th-order half-chip lag features including chip rate (and multiples), double-carrier offset, and quadruple-carrier offset.

Figure 10:
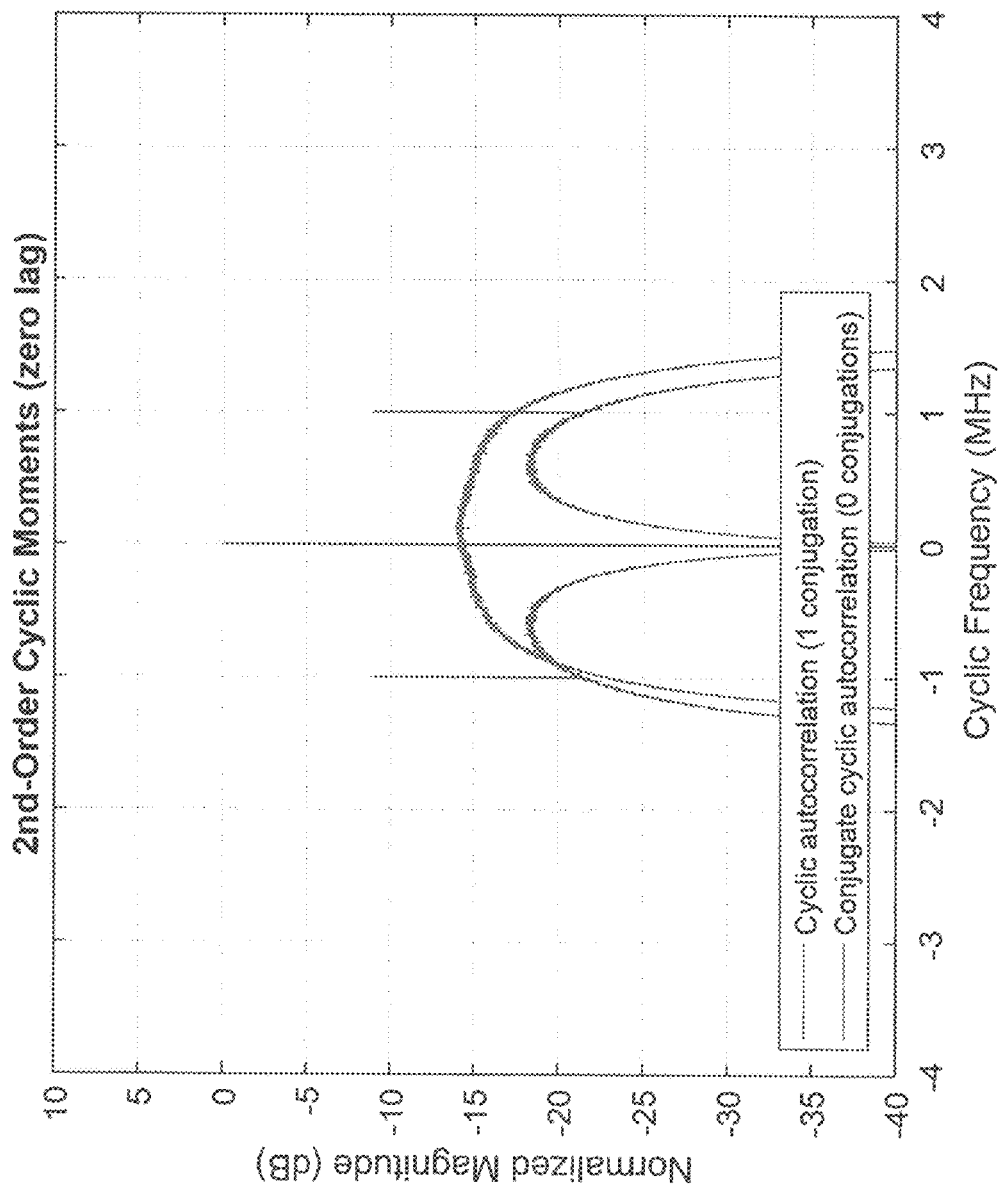
FIG. 10 is a plot of 2nd-order cyclic moments for root-raised-cosine QPSK with zero-lag illustrating the normalized magnitude (dB) of the cyclic autocorrelation and the conjugate cyclic autocorrelation.
Figure 11:
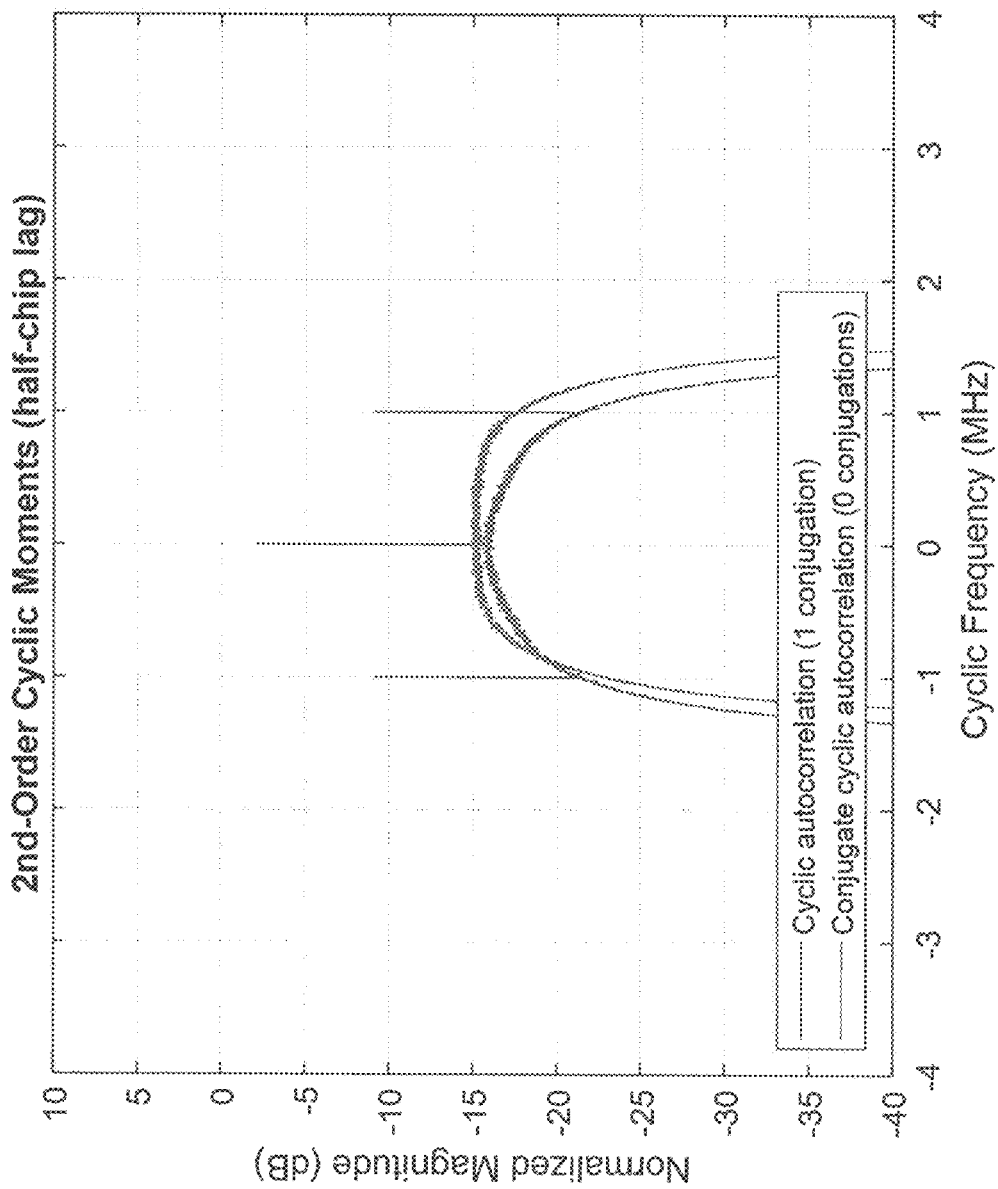
FIG. 11 is a plot of 2nd-order cyclic moments for root-raised-cosine QPSK with half-chip-lag illustrating the normalized magnitude (dB) of the cyclic autocorrelation and the conjugate cyclic autocorrelation.

FIGS. 10 through 13 are plots of both 2nd-order and 4th-order moments at both zero (FIGS. 10 and 12) and half-chip lag (FIGS. 11 and 13) for root-raised-cosine QPSK with 0.4 roll-off, a 1 MHz chip rate with a 62.5 kHz carrier offset. Second order features (FIG. 11) include the chip rate (double-carrier offset features are not present). FIG. 10 is a plot of 4th-order moments (zero lag) of various conjugations (([0101], [0100], & [0000]) where FIG. 11 illustrates 4th-order half-chip lag features including chip rate (and double chip rate), and quadruple-carrier offset (double-carrier offset features are not present).

Figure 16:
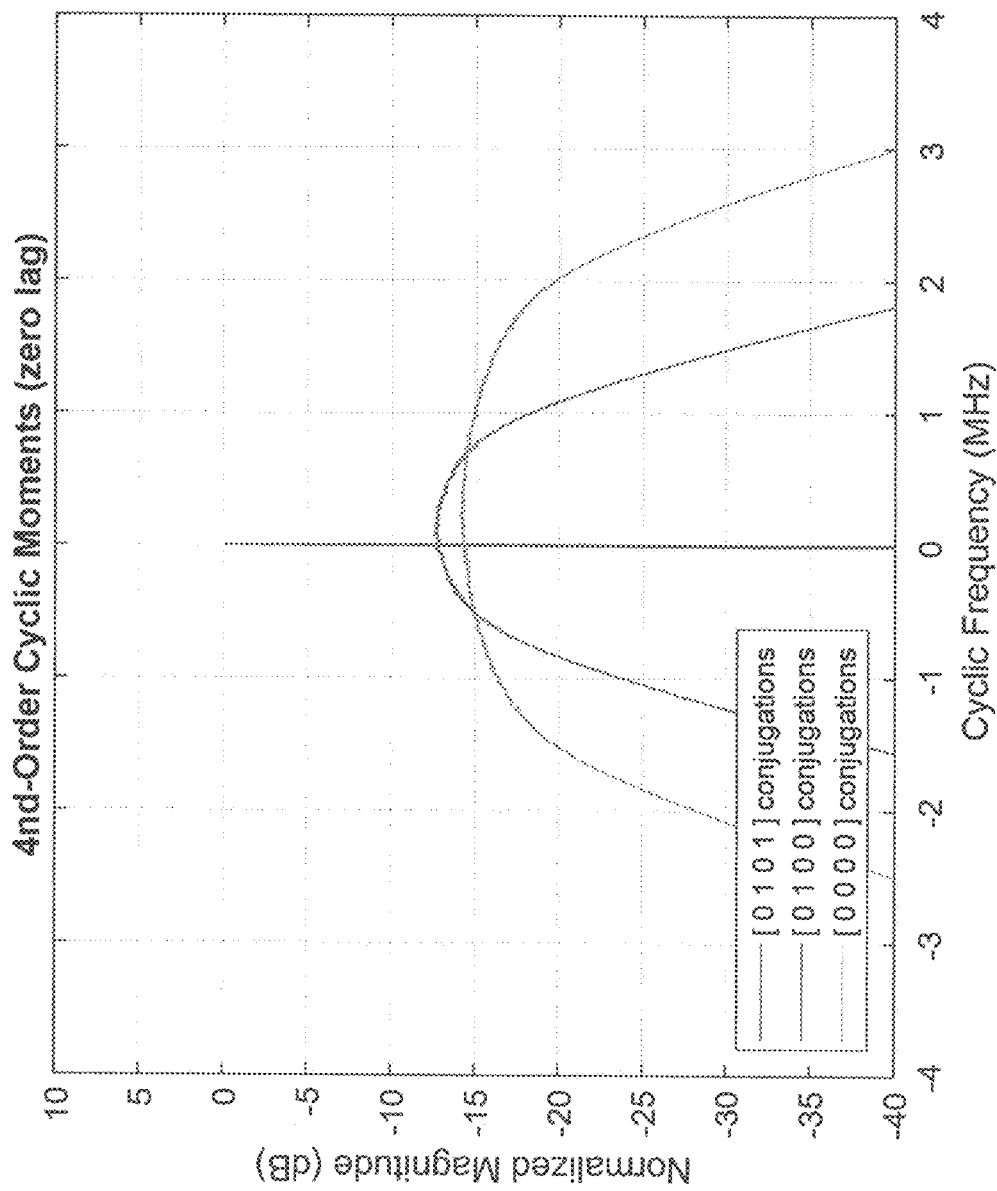
FIG. 16 is a plot of 4th-order cyclic moments for high entropy continuous phase modulation (HE-CPM) with zero-lag illustrating the normalized magnitude (dB) of various conjugations ([0101], [0100], & [0000])
Figure 17:
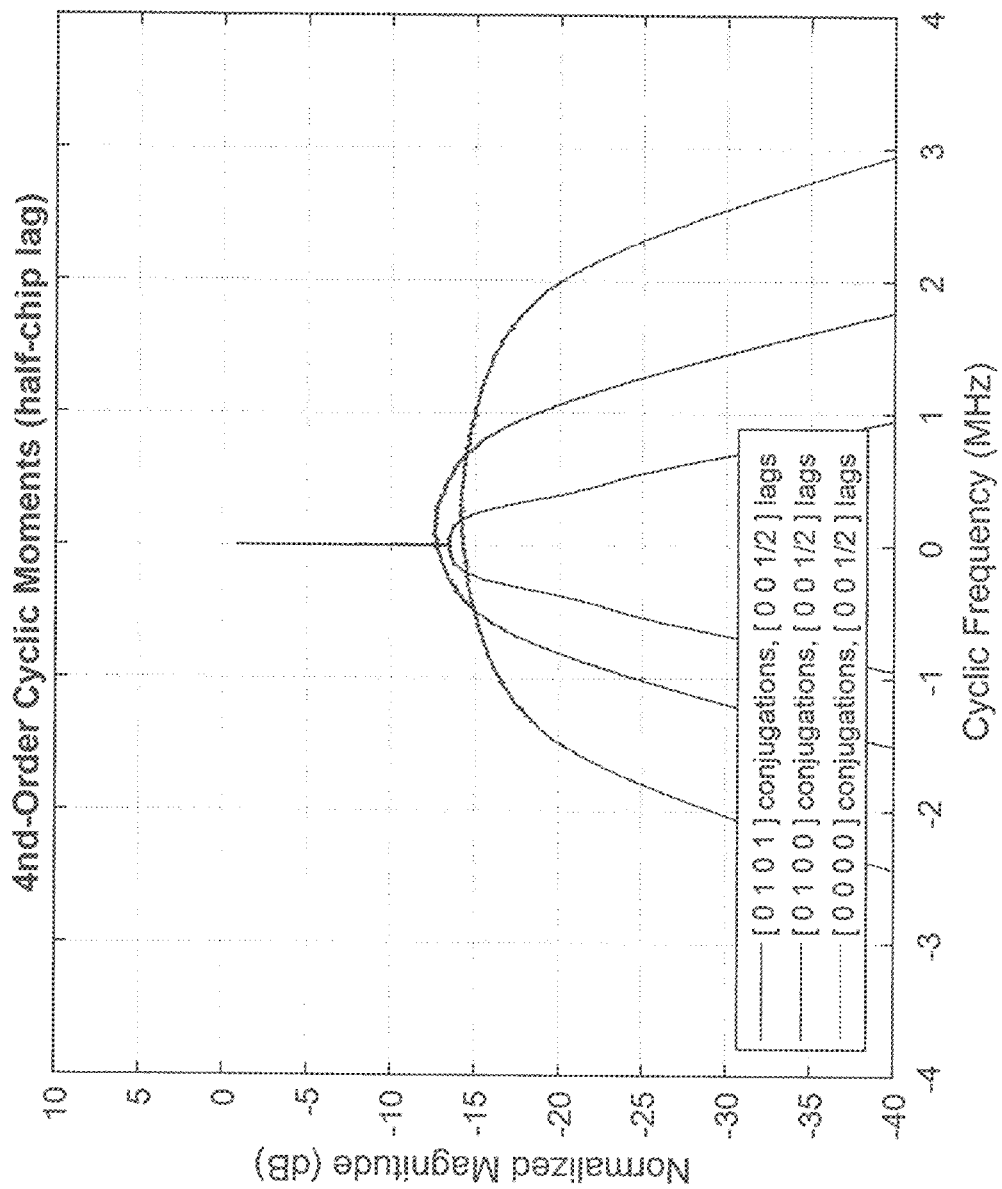
FIG. 17 is a plot of 4th-order cyclic moments for high entropy continuous phase modulation (HE-CPM) with half-chip-lag illustrating the normalized magnitude (dB) of various conjugations ([0101], [0100], & [0000]).

Exemplary embodiments of a presently preferred transmitter (communicator) of the present disclosure are illustrated in the plots of FIGS. 14 through 17. FIGS. 14 through 17 are 8-ary HE-CPM plots of both 2nd-order and 4th-order moments at both zero (FIGS. 14 and 16) and half-chip lag (FIGS. 15 and 17) with the high-entropy constant phase modulation of the present disclosure. The plots of FIGS. 14-17 are for a 1 MHz chip rate and with a 62.5 kHz carrier offset. Second order features (FIG. 15) are not present. FIG. 16 is a plot of 4th-order moments (zero lag) of various conjugations (([0101], [0100], & [0000]) where FIG. 17 illustrates 4th-order half-chip lag without detectable features.

FIG. 1 illustrates an embodiment of the present disclosure where a random symbol is produced by the symbol generator 16 for output to the M-ary continuous phase modulator 18. The selector 12 receives a binary chip 10 and selects either the provided symbol or symbol inverse (FIG. 2). The output is then moved in phase by the delta-phase mapper 20 where the output phase shifted signal then enters a pulse-shaping filter 22 which smooths any abrupt phase transitions from the output signal. The M-ary continuous phase modulator's 18 frequency modulator 24 then modulates the frequency of the signal at a constant amplitude and power.

As illustrated in FIG. 2, a TRANSEC 14 (FIG. 1) drives the generation of a pseudorandom symbol 16 corresponding to a signal phase for each chip 10 (FIG. 1). FIG. 2 is a diagram in the complex plane where/is the in-phase (real) part and Q is the quadrature (imaginary) part. A symbol (at approximately 45° between the/and Q axes) may be selected (or the symbol's inverse). In a binary system the chip inverted symbol would be at 180°. In a 4-ary system the chip would select the generated symbol or one of three 90° rotations of it. The selected symbol enters a continuous phase modulator and an exemplary frequency response of the pulse shaping filter 18, FIG. 1) is illustrated in FIG. 3A. Prior to a selected symbol (12, 20; FIG. 1) entering the pulse-shaping filter 22 it resides in an uncontained spectrum.

In operation, this feature of the present disclosure suppresses cyclic features in signal transmissions of the disclosed LPD. Thus, where the chip rate is 1 MHz the main filter lobe resides at between plus and minus half 1 MHz (e.g., ±−0.5 and 0.5 MHz). The main lobe is contained entirely within the bandwidth equal to the chip rate such that inter-symbol interference (ISI) is produced (i.e., symbol values of adjacent symbols trespass into their neighbors).

FIG. 3B illustrates the impulse response of a pulse shaping filter according to an exemplary embodiment (FIG. 3A) where the x-axis is symbol time (current chip time equal to zero, previous chip time −1, and next chip time+1) and that the current chip influence on adjacent symbols is not zero. The transmitter of the present disclosure is a stochastic source as it introduces phase interference in adjacent symbols (ISI) and increases the entropy of the resulting signal. The resulting signal has a Gaussian bell shape in the frequency domain (FIG. 4).

A stationary stochastic system has an invariant mean and standard deviation even where individual samples can show great divergence. In a cyclostationary system, signal statistics change cyclically (periodically over time). See, for example, Gardner, Wm. A. "*Exploitation of Spectral Redundancy in Cyclostationary Signals*." IEEE SP Magazine April 1991: 14-36. In normal communication systems, signals are employed which exhibit cyclostationary characteristics. This periodicity in signal statistics can be taken advantage of to ease synchronization and carrier recovery in conventional communication systems. Unfortunately, these cyclic features can also be used by unauthorized receivers.

FIG. 5, adopted from Gardner (FIG. 14c), illustrates the second-order cyclic statistics of a conventional communication signaling scheme (binary phase-shift keying) in the form of the cyclic spectrum (also called spectral correlation). The cyclic spectrum is the Fourier transform of the cyclic autocorrelation, as discussed previously. The cyclic autocorrelation is equivalent to the second-order cyclic moment. Higher-order cyclic moments are also of interest. The second- and fourth-order cyclic moments of two conventional signaling schemes, as well as HE-CPM, are considered in FIGS. 6-17.

FIGS. 6-9, illustrate 2nd-order and 4th-order cyclic moments for binary phase-shift keying (BPSK) with a rectangular pulse shape (shifting between zero phase and 180° phase without smoothing) and a chip rate of 1 MHz (62.5 kHz carrier offset added to better illustrate carrier frequency features). FIG. 6 illustrates tau (t) equal to zero (zero lag) for 2nd-order. FIG. 7 illustrates tau equal to half a chip time (half-chip lag) for 2nd-order. FIG. 8 illustrates tau (t) at zero lag for 4th-order. FIG. 9 illustrates tau at half-chip lag for 2nd-order. FIGS. 6-9 show various cyclic features such as discrete spectral lines related to the chip rate (or multiples thereof) along with the carrier frequency offset. These features are easily detectable by unauthorized receivers.

Figure 12:
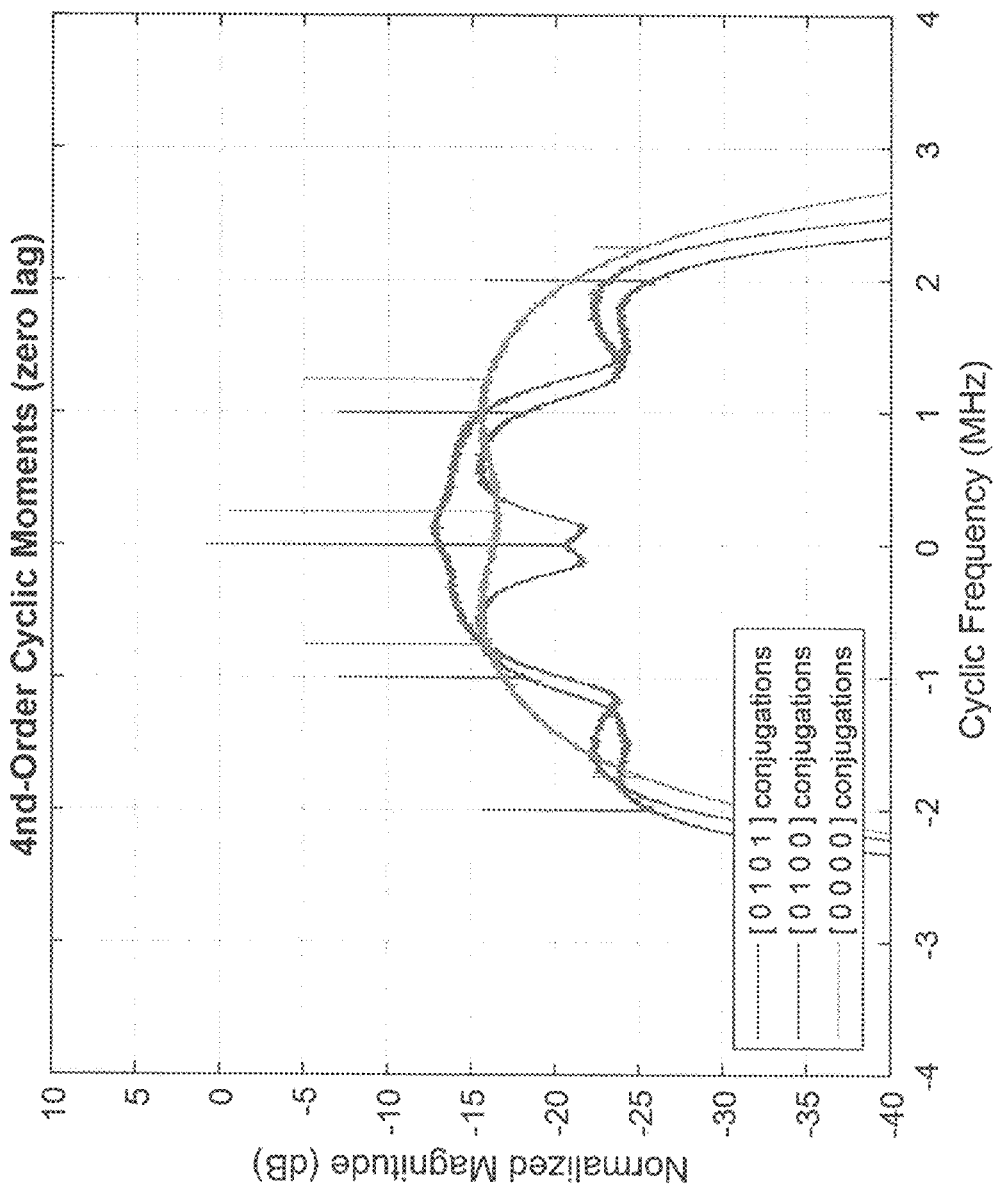
FIG. 12 is a plot of 4th-order cyclic moments for root-raised-cosine QPSK with zero-lag illustrating the normalized magnitude (dB) of various conjugations ([0101], [0100], & [0000])
Figure 13:
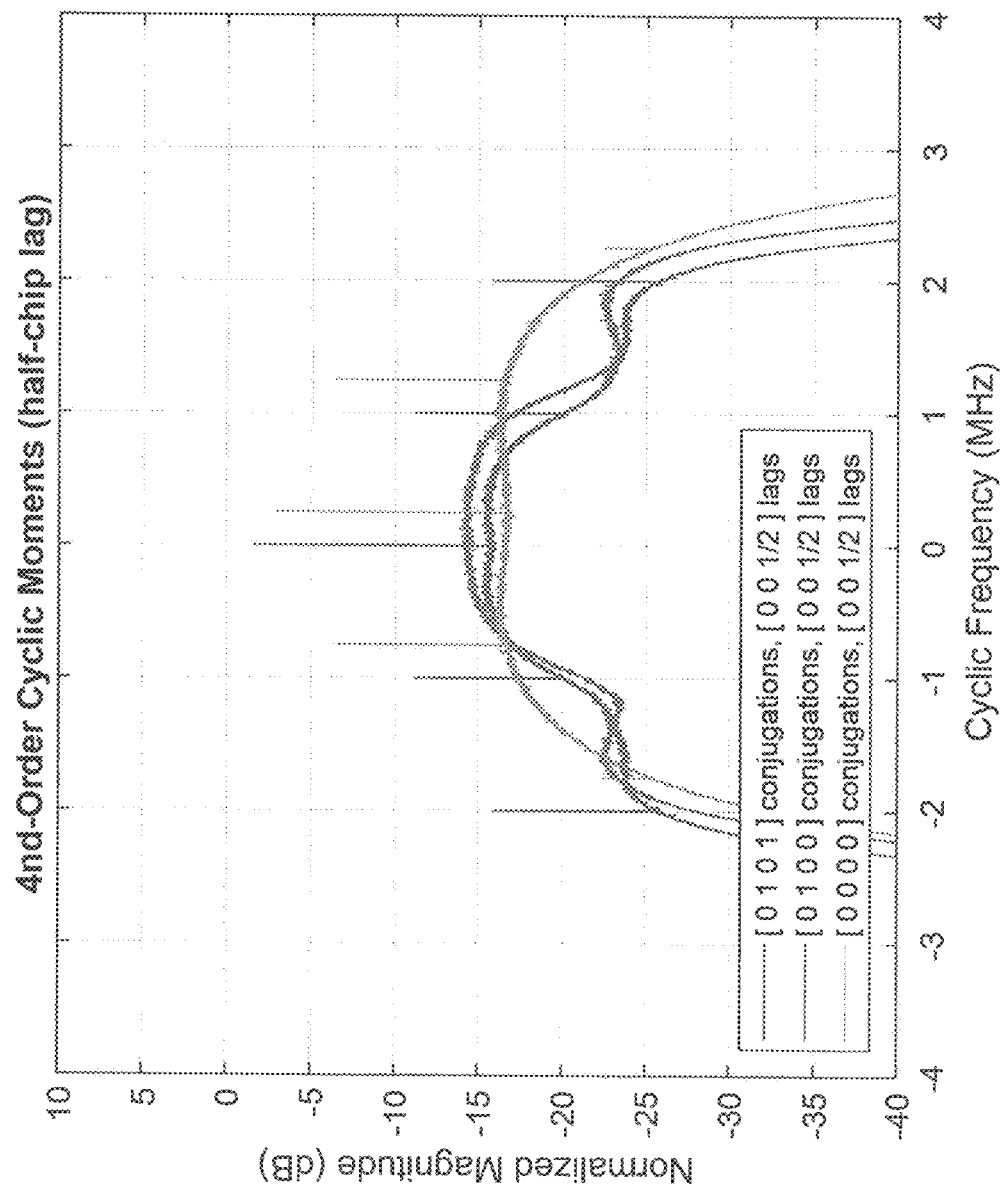
FIG. 13 is a plot of 4th-order cyclic moments for root-raised-cosine QPSK with half-chip-lag illustrating the normalized magnitude (dB) of various conjugations ([0101], [0100], & [0000])
Figure 14:
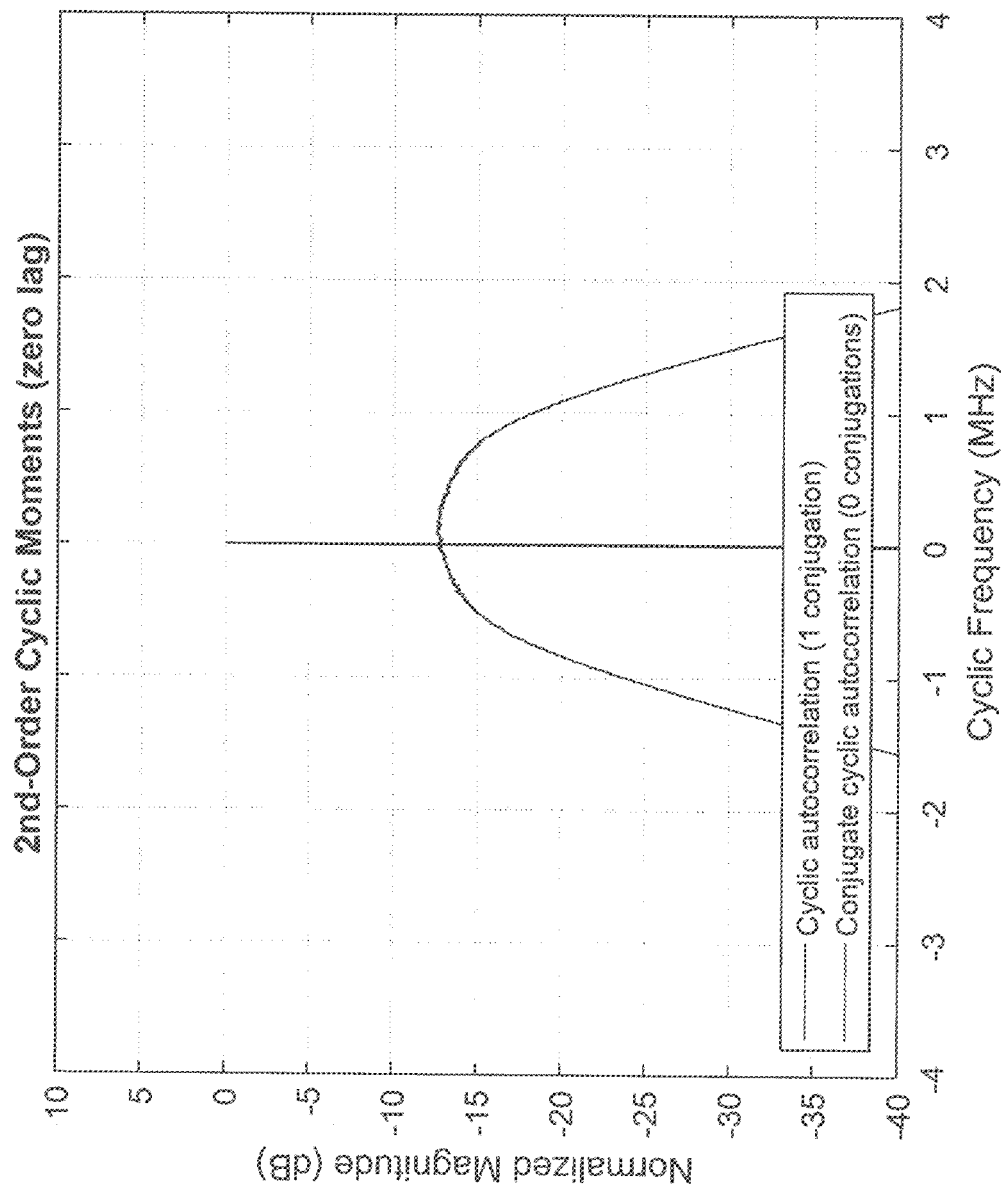
FIG. 14 is a plot of 2nd-order cyclic moments for high entropy continuous phase modulation (HE-CPM) with zero-lag illustrating the normalized magnitude (dB) of the cyclic autocorrelation and the conjugate cyclic autocorrelation.
Figure 15:
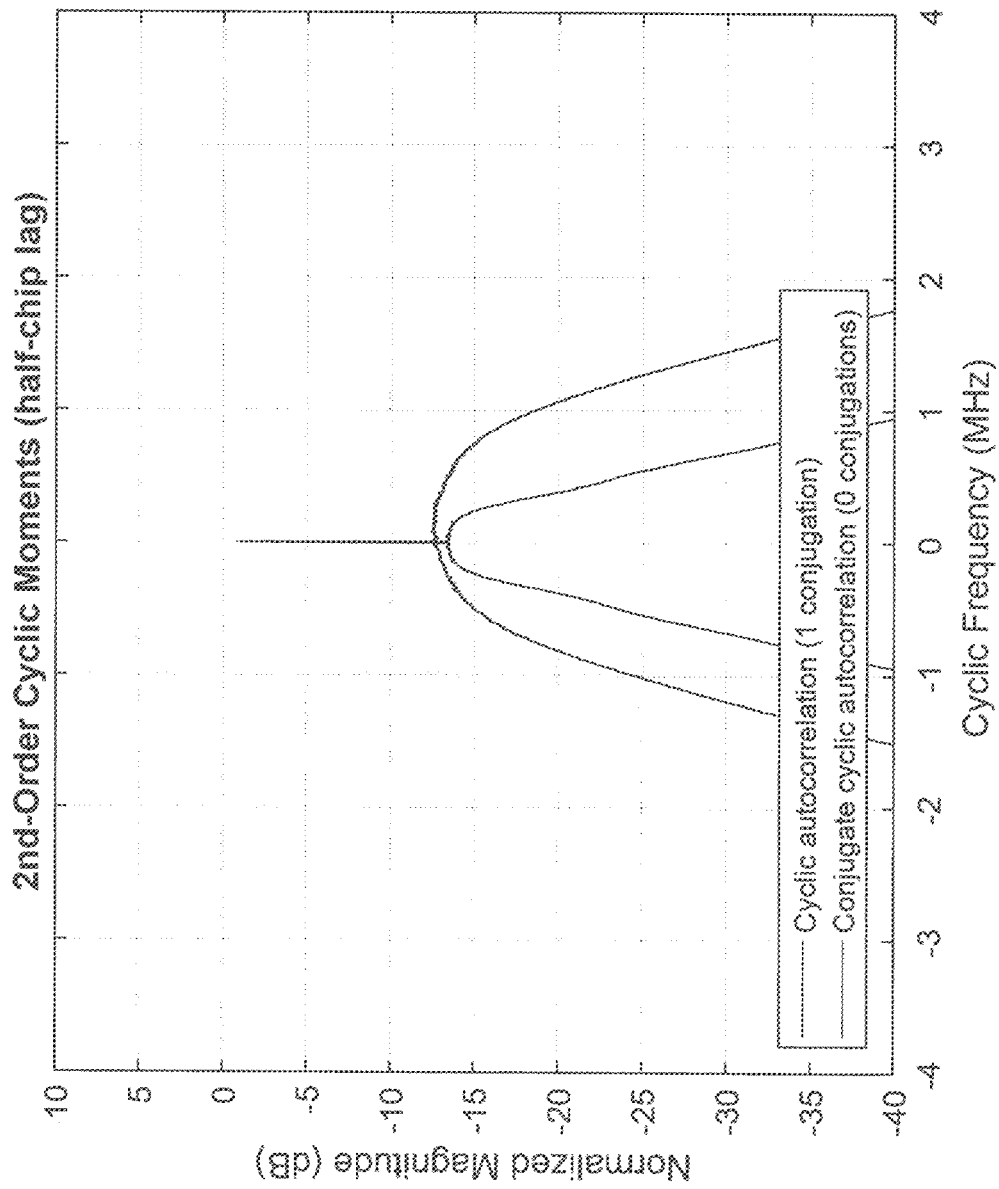
FIG. 15 is a plot of 2nd-order cyclic moments for high entropy continuous phase modulation (HE-CPM) with half-chip-lag illustrating the normalized magnitude (dB) of the cyclic autocorrelation and the conjugate cyclic autocorrelation.

FIGS. 10-13 illustrate (respectively) 2nd-order and 4th-order cyclic moments in (QPSK) with a root-raised-cosine pulse shape (0.4 roll-off factor) and a chip rate of 1 MHz (62.5 kHz carrier offset added to better illustrate carrier frequency features). FIG. 10 illustrates tau (t) at zero-lag for 2nd-order. FIG. 11 illustrates tau at half-chip lag for $2^{nd}$-order. FIG. 12 illustrates tau (t) at zero lag for 4th-order. FIG. 13 illustrates tau at half-chip lag for 2nd-order. FIGS. 10-13 show discrete spectral lines related to the chip rate (or multiples thereof). Chip rate is an easily detectable signal feature.

FIGS. 14-17 illustrate an embodiment of the present disclosure utilizing 8-ary HE-CPM with a 1 MHz chip rate, resulting in a constant-envelope signal with a 0.5 MHz effective noise bandwidth (62.5 kHz carrier offset added to better illustrate carrier frequency features). 2nd-order and 4th-order moments at tau (t) equal to zero (zero lag) and tau equal to half a chip time (half-chip lag) are illustrated. The TRANSEC 14 (FIG. 1) generates symbols in one of eight phases. Other embodiments of the present invention utilize orders other than 8-ary, though powers of 2 (e.g., 16-ary, or 32-ary) typically simplify implementation.

In other embodiments other constant envelope configurations may be utilized for arbitrary chip rates. A Ku or Ka-band power amplifier having a non-linear output was utilized in the examples provided and is currently preferred for SWaP-C considerations.

The invention claimed is:

1. A system for generating a signal with a constant envelope and suppressed cyclic features, the system comprising:
    a transmission security (TRANSEC) function configured to generate a pseudorandom symbol by M-ARY symbol generation,
    a spread spectrum chip configured to select a symbol with a signal phase, the selected symbol corresponding to the generated pseudorandom symbol or a phase rotation of the pseudorandom symbol; and
    an M-ary continuous phase modulator, the M-ary continuous phase modulator comprising:
        a delta-phase mapper configured to map the signal phase based on the selected symbol;
        a pulse-shaped filter configured to band limit the spectrum of the mapped signal, the pulse-shaped filter configured to introduce inter-symbol interference from a previous and a subsequent symbol into a current symbol, the inter-symbol interference introduced by the main lobe of the signal phase being contained within a bandwidth of a chip rate of the spread spectrum chip; and
        a frequency modulator to modulate the frequency of the generated signal for transmitting information by the generated signal.

2. The system of claim 1, wherein the suppressed cyclic features comprise suppressed second order features corresponding to the chip rate and a double-carrier offset.

3. The system of claim 2, wherein the suppressed second order features are suppressed at a conjugate cyclic autocorrelation at one or more of a zero lag or a half-chip lag.

4. The system of claim 1, wherein the suppressed cyclic features comprise fourth order features corresponding to the chip rate, a double chip rate, a double-carrier offset, and a quadruple carrier offset.

5. The system of claim 4, wherein the fourth order features are at suppressed at a [0100] conjugation at one or more of a zero lag or a half-chip lag.

6. The system of claim 1, wherein the spread spectrum chip is a binary chip, the phase rotation being a 180 degree phase rotation.

7. The system of claim 1, wherein the spread spectrum chip is a 4-ary chip, the phase rotation being at least one of a 90 degree, a 180 degree, or a 270 phase rotation.

8. The system of claim 1, wherein the M-ary symbol generation is 8-ary symbol generation.

9. The system of claim 1, wherein the M-ary symbol generation is one of 16-ary or 32-ary symbol generation.

10. The system of claim 1, wherein the spread spectrum chip operates in at least one of the kilocycle, megacycle, or gigacycle chip rate.

11. The system of claim 1, the system further comprising a power amplifier configured to amplify the generated signal for transmission.

12. The system of claim 11, wherein the transmission is over one of a Ku band or a Ka band.

13. A method for generating a constant envelope signal with suppressed cyclic features, the method comprising:
    generating a plurality of pseudorandom symbols by a transmission security (TRANSEC) step;
    selecting symbols from the plurality of generated pseudorandom symbols by a spread spectrum chip with a chip rate, the selected symbols corresponding to the plurality of generated pseudorandom symbols or a phase rotation of the pseudorandom symbols;
    providing the selected symbols to an M-ary continuous phase modulator to generate a constant envelope signal with suppressed cyclic features; the M-ary continuous phase modulator generating the constant envelope signal with suppressed cyclic features by:
    providing the selected symbols to a delta phase mapper to map a signal phase based on the selected symbol;
    providing the signal phase to a pulse shaping filter to band limit the spectrum of the mapped signal and introduce inter-symbol interference, the inter-symbol interference introduced by the main lobe of the selected symbols being contained within a bandwidth of the spread spectrum chip rate; and
    providing the band limited signal with inter-symbol interference to a frequency modulator to modulate a frequency of the signal for transmitting information.

14. The method of claim 13, wherein the suppressed cyclic features of the generated constant envelope signal comprise suppressed second order features corresponding to the chip rate and a double-carrier offset.

15. The method of claim 13, wherein the suppressed cyclic features of the generated constant envelope signal comprise suppressed fourth order features corresponding to the chip rate, a double chip rate, a double-carrier offset, and a quadruple carrier offset.

* * * * *